(12) United States Patent
Doyon et al.

(10) Patent No.: US 10,407,902 B2
(45) Date of Patent: Sep. 10, 2019

(54) BUILDING FACADE SYSTEM AND RELATED ASSEMBLIES INCLUDING A BYPASS INSULATING PROFILE

(71) Applicant: SYSTÈMES STEKAR INC., Beauceville (CA)

(72) Inventors: Raynald Doyon, St-Georges (CA); Ricardo D'angelo, Québec (CA)

(73) Assignee: GESTION RAYNALD DOYON INC., Québec (CA)

( * ) Notice: Subject to any disclaimer, the term of this patent is extended or adjusted under 35 U.S.C. 154(b) by 0 days.

(21) Appl. No.: 16/148,790

(22) Filed: Oct. 1, 2018

(65) Prior Publication Data
US 2019/0100913 A1 Apr. 4, 2019

Related U.S. Application Data

(60) Provisional application No. 62/566,788, filed on Oct. 2, 2017.

(51) Int. Cl.
*E04B 2/96* (2006.01)
*E06B 3/54* (2006.01)

(52) U.S. Cl.
CPC ............... *E04B 2/967* (2013.01); *E06B 3/54* (2013.01)

(58) Field of Classification Search
CPC ..... E04B 2/88; E04B 2/90; E04B 2/96; E04B 2/967; E06B 3/54; E06B 3/5427
See application file for complete search history.

(56) References Cited

U.S. PATENT DOCUMENTS

| | | | | |
|---|---|---|---|---|
| 4,561,228 A | * | 12/1985 | Kaminaga | E04B 2/96 52/204.591 |
| 4,599,838 A | * | 7/1986 | Kaminaga | E04B 2/90 52/204.591 |
| 4,625,482 A | * | 12/1986 | Kaminaga | E04B 2/96 49/DIG. 1 |
| 5,355,645 A | * | 10/1994 | Farag | E04B 2/96 52/235 |
| 5,579,616 A | * | 12/1996 | Farag | E04B 2/96 52/204.5 |
| 6,425,218 B1 | | 7/2002 | Doyon et al. | |
| 6,442,907 B1 | | 9/2002 | Doyon et al. | |
| 7,676,999 B2 | * | 3/2010 | Arias | E06B 3/5427 292/175 |
| 10,280,679 B2 | * | 5/2019 | Al Kassas | E06B 3/5418 |

(Continued)

*Primary Examiner* — Brian D Mattei
(74) *Attorney, Agent, or Firm* — Bookoff McAndrews, PLLC

(57) ABSTRACT

A building facade system for covering a building facade including a building wall and a window opening, comprising at least one window assembly mountable to mullions provided across the window opening and a plurality of wall assemblies surrounding the at least one window assembly, each wall assembly being independently mountable onto rails extending across the building wall. The at least one window assembly is configured to reduce thermal flow between an interior environment and an exterior environment, and includes a bypass insulating profile extending from a connection insulating profile externally towards a window panel and inwardly over an exterior profile, to define an air chamber between the bypass insulating profile and an inward surface of the exterior profile.

20 Claims, 9 Drawing Sheets

(56) References Cited

U.S. PATENT DOCUMENTS

| | | | |
|---|---|---|---|
| 2008/0245027 A1* | 10/2008 | Lambertini | E06B 3/26347 52/717.02 |
| 2008/0282627 A1* | 11/2008 | Lenox | E06B 3/26303 52/204.63 |
| 2010/0300021 A1* | 12/2010 | Falk | E04B 2/88 52/235 |
| 2017/0022708 A1* | 1/2017 | Dolby | E04B 2/967 |
| 2019/0085618 A1* | 3/2019 | Al Kassas | E06B 3/5418 |
| 2019/0093349 A1* | 3/2019 | LeVan | E04B 2/90 |

* cited by examiner

BUILDING FACADE SYSTEM AND RELATED ASSEMBLIES INCLUDING A BYPASS INSULATING PROFILE

RELATED PATENT APPLICATION

This nonprovisional patent application claims benefit under 35 U.S.C. § 119 to U.S. Provisional Patent Application No. 62/566,788, filed Oct. 2, 2017, the entirety of which is incorporated herein by reference.

TECHNICAL FIELD

The present invention relates to a building facade system, and more particularly to a curtain window wall assembly including a bypass insulating profile reducing thermal flow within a building facade.

BACKGROUND

Building facade systems are used to cover a building facade including window openings defined in wall portions. The building facade system can include window panels for covering the window openings of the building façade, the window panels being installed on horizontally-extending and vertically-extending mullions encased within the window openings of the building facade.

Various interconnected profiles are provided to frame each window panel and secure said window panel to the mullions of the building facade. To provide both lightness and strength, aluminum is often chosen as an adequate material for the interconnected profiles. However, aluminum and analog metallic materials are good thermal conductors allowing creation of thermal bridges having various paths depending on the configuration of the connection profiles.

Thermal insulation can be therefore provided to reduce thermal flow between the exterior environment and the interior environment (e.g. room of the building). One way to reduce thermal bridges via the connection profiles includes the use of thermal break elements creating a conduction rupture in a metal to metal connection. For example, U.S. Pat. No. 6,442,907 describes a curtain window wall including variations of thermal break elements.

There is still a need for improved thermal insulation reducing thermal flow between the exterior environment and the interior environment of the building façade via the interconnected elements which secure window panels to the mullions.

SUMMARY

Present techniques relate to reduction of thermal energy losses from thermal bridging and improvement of an overall building envelope performance. There is provided a building facade system and related thermal break assembly configured to reduce heat loss from the building envelope.

The building facade system is configured to cover a building facade with window assemblies for covering window openings and wall assemblies for covering wall portions. Each window assembly is mounted onto horizontally-extending and vertically extending mullions encased within a window opening. One or more window assemblies may be needed to cover a same window opening depending on the relative size of the window opening with respect to a window panel of the window assembly. For example, four window assemblies may be mounted across a same window opening. Each window assembly may be defined as including a window panel, a thermal break assembly, an interior profile protruding internally from the thermal break assembly towards the window opening and an exterior profile protruding externally from the thermal break assembly towards the window panel.

The thermal break assembly includes different insulating elements provided to create a thermal gradient profile deviated with respect to the exterior profile of the window panel assembly, such that thermal losses to the building envelope are reduced. More particularly, the thermal break assembly includes a connection insulating profile reducing the thermal flow between the interior profile and the exterior profile of the window assembly. The thermal break assembly further includes a bypass insulating profile, joining the window panel to the connection insulating element inwardly of the window opening, and therefore reducing the thermal flow between the interior environment and the exterior profile. The bypass insulating profile may be sized and shaped to externally deviate the thermal gradient profile along the building envelope.

More particularly, in one aspect, there is provided a window assembly mountable to mullions provided across a window opening of a building facade for covering at least partially said window opening. The window assembly includes a window panel positioned in alignment with the window opening so as to extend between an interior environment and an external environment of the building facade, a window profile assembly mechanically connecting the window panel to the mullions of the window opening, and a thermal break assembly for reducing a thermal flow between the interior environment and the external environment via the window profile assembly. The window profile assembly includes an exterior profile securable to edge portions of the window panel, and an interior profile securable to the mullions. The thermal break assembly includes a connection insulating profile mechanically interconnecting the interior profile and the exterior profile, the connecting insulating profile having a lower thermal conductivity than both the exterior profile and the interior profile, to reduce thermal conduction between the interior profile and the exterior profile. The thermal break assembly further includes a bypass insulating profile extending from the connection insulating profile externally towards the window panel and inwardly over the exterior profile, to define an air chamber between the bypass insulating profile and an inward surface of the exterior profile, thereby reducing thermal convection between the interior environment and the exterior profile.

In some implementations of the window assembly, the bypass insulating profile may have a lower thermal conductivity than the exterior profile. The bypass insulating profile may also have a lower thermal conductivity than the connection insulating profile.

In some implementations of the window assembly, the bypass insulating profile can be made of a rigid material including PVC and the connection insulating profile can be made of the same or another rigid material including polyamide and/or PVC.

In some implementations of the window assembly, the connection insulating profile may include two opposed insulating halves, spaced away from each other so as to define an air gap therebetween. Optionally, each of the two halves has a proximal end engaged within a corresponding recess of the interior profile, and a distal end engaged within another corresponding recess of the exterior profile.

In some implementations of the window assembly, the connection insulating profile has an inner surface and the bypass insulating profile may contact the inner surface of the connection insulating profile. For example, the connection insulating profile can comprise two protrusions extending inwardly to form a jaw with a connection recess defined in-between. An internal end portion of the bypass insulating profile may be engaged within the connection recess of the connection insulating profile. Optionally, the bypass insulating profile may end with the internal end portion engaging the connection insulating profile.

In some implementations of the window assembly, the air chamber can extend continuously from an internal end of the bypass insulating profile to an external end of the exterior profile.

In some implementations of the window assembly, the bypass insulating profile may include an external end portion abutting against a portion of the inward surface of the exterior profile. Optionally, the external end portion of the bypass insulating profile mechanically engages with the portion of the inward surface of the exterior profile at an external end thereof. Further optionally, the external end portion of the bypass insulating profile is engaged within a secondary recess of exterior profile, inwardly of the window panel.

In some implementations of the window assembly, the bypass insulating profile and the exterior profile may be spaced-apart from an inner surface of the window panel. Optionally, the window assembly may further include at least one seal extending between external end surfaces of the bypass insulating profile and the exterior profile and the inner surface of the window panel. A gasket seal may be provided between the external end surface of the bypass insulating profile and an inner surface of the window panel for mating and sealing therebetween. The bypass insulating profile may be connected to both the gasket seal and the exterior window profile. The gasket seal can be made of a foam of polyurethane. Further optionally, the window assembly further comprises a silicon seal filling a hollow channel formed inwardly of the gasket seal, the inner surface of the window panel, and the external end surface of the exterior profile.

In some implementations of the window assembly, a portion of the interior profile can be disconnectable from the mullions so as to enable splaying of the window assembly about a mullion axis, externally thereof.

In another aspect, there is provided a curtain window wall comprising a plurality of window assemblies as defined herein, each window assembly being independently mountable onto the mullions of the window opening to form the curtain window wall extending across an entire surface of the window opening.

In some implementations of the curtain window wall, two adjacent window assemblies may be in a symmetrical configuration with respect to one mullion. The window panels may also be in a coplanar relationship with one another.

In another aspect, there is provided a building facade system for covering a building facade including a building wall and a window opening defined in said building wall. The building facade system includes at least one window assembly mountable to mullions provided across the window opening, and a plurality of wall assemblies surrounding the at least one window assembly, each wall assembly being independently mountable onto rails extending across the building wall. The window assembly includes a window panel positioned in alignment with the window opening so as to extend between an interior environment and an external environment of the building facade, a window connecting assembly mechanically connecting the window panel to the mullions of the window opening, and a thermal break assembly for reducing a thermal flow between the interior environment and the external environment via the window profile assembly. The window connecting assembly includes an exterior profile securable to edge portions of the window panel, and an interior profile securable to the mullions. The thermal break assembly includes a connection insulating profile mechanically interconnecting the interior profile and the exterior profile, the connecting insulating profile having a lower thermal conductivity than both the exterior profile and the interior profile, to reduce thermal conduction between the interior profile and the exterior profile. The thermal break assembly further includes a bypass insulating profile extending from the connection insulating profile externally towards the window panel and inwardly over the exterior profile, to define an air chamber between the bypass insulating profile and an inward surface of the exterior profile, thereby reducing thermal convection between the interior environment and the exterior profile. The wall assembly includes a wall panel for covering a portion of the building wall, the wall panel being spaced-apart from the building wall, and a wall connecting assembly comprising at least first and second interconnected profiles, the first profile mechanically engaging a perimeter of the wall panel and the second profile mechanically engaging the rails of the building wall.

In some implementations of the building facade system, the at least one window assembly and the wall assemblies are arranged with respect to one another in accordance with the positioning of the window opening of the building facade. The window panel may be in a coplanar relationship with the adjacent wall panels.

In some implementations of the building facade system, the window connecting assembly may be staggered with respect to the adjacent wall connecting assemblies to make up for a gap between the rails and the mullions along the building facade.

In some implementations of the building facade system, the at least one window assembly may include one or more features as defined above or hereinafter.

In some implementations of the building facade system, a plurality of window assemblies as defined herein may be provided for covering the window opening, each window assembly being independently mountable onto the mullions of the window opening to form a curtain window wall spreading over an entire surface of the window opening.

The objects, advantages and other features of the present implementations will become more apparent and be better understood upon reading of the following non-restrictive description, given with reference to the accompanying drawings.

BRIEF DESCRIPTION OF THE DRAWINGS

Embodiments of the building facade system, window assembly and related bypass insulating profile are represented in and will be further understood in connection with the following figures.

DETAILED DESCRIPTION

Figure 1:
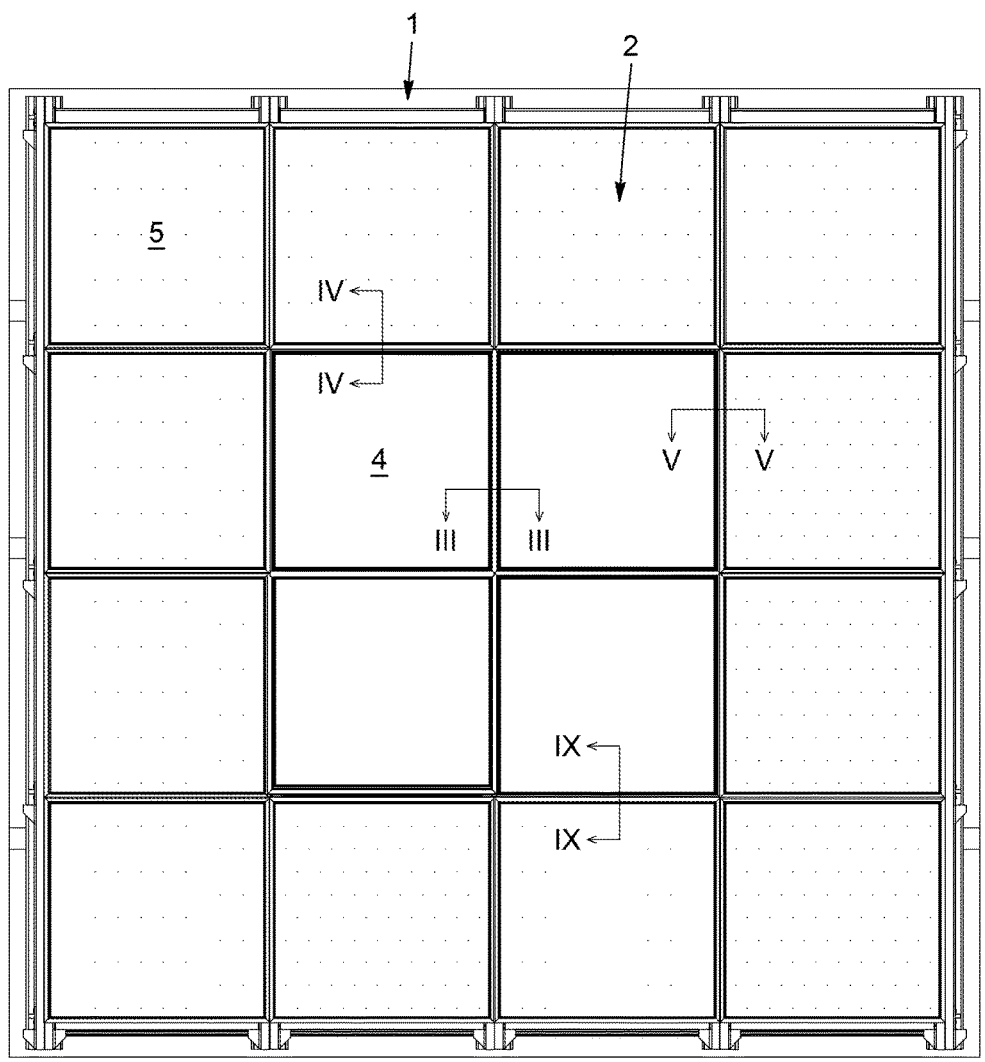
FIG. 1 is a front view of a building facade system including four window assemblies covering a window opening of the building facade and a plurality of wall assemblies covering portions of the building wall.

A building facade system as encompassed herein is to be understood as a plurality of panels mountable to a building facade via a plurality of connecting assemblies. The building facade includes a wall (or wall portions) and apertures within said wall defining window openings. Number, shape and size of the panels may be tailored to dimensions of such wall portions and apertures. The building facade system can be used during construction of a building or to update the appearance of an existing building facade.

It should be noted that the same numerical references refer to similar elements. Furthermore, for the sake of simplicity and clarity, namely so as to not unduly burden the figures with several reference numbers, not all figures contain references to all the components and features, and references to some components and features may be found in only one figure, and components and features of the present disclosure which are illustrated in other figures can be easily inferred therefrom. The embodiments, geometrical configurations, materials mentioned and/or dimensions shown in the figures are optional and are given for exemplification purposes only. Therefore, the descriptions, examples, methods and materials presented in the claims and the specification are not to be construed as limiting but rather as illustrative only.

It is worth mentioning that throughout the following description when the article "a" is used to introduce an element it does not have the meaning of "only one" it rather means of "one or more". For instance, the building facade system according to the invention can be provided with one or more window assemblies, and/or one or more wall assemblies, etc. without departing from the scope of the present invention.

It is also to be understood that where the specification states that a component, feature, structure, or characteristic "may", "might", "can" or "could" be included, that particular component, feature, structure, or characteristic is not required to be included.

In the present description, the term "about" means within an acceptable error range for the particular value as determined by one of ordinary skill in the art, which will depend in part on how the value is measured or determined, i.e. the limitations of the measurement system. It is commonly accepted that a 10% precision measure is acceptable and encompasses the term "about".

Although the embodiments of the building facade system and corresponding parts thereof consist of certain geometrical configurations as explained and illustrated herein, not all of these components and geometries are essential and thus should not be taken in their restrictive sense. It is to be understood, as also apparent to a person skilled in the art, that other suitable components and cooperation therebetween, as well as other suitable geometrical configurations, may be used for the various assemblies of the building facade system, as will be explained herein and as can be easily inferred herefrom by a person skilled in the art. Moreover, it will be appreciated that positional descriptions such as "top", "bottom", "above", "below", "left", "right", "inward", "outward", "interior", "exterior" and the like should, unless otherwise indicated, be taken in the context of the figures and should not be considered limiting.

In the present description, an embodiment is an example or implementation of the invention. The various appearances of "one embodiment," "an embodiment", "some embodiments", "some implementations" or "for example" do not necessarily all refer to the same embodiments. Although various features of the invention may be described in the context of a single embodiment, the features may also be provided separately or in any suitable combination. Conversely, although the invention may be described herein in the context of separate embodiments for clarity, the invention may also be implemented in a single embodiment.

Figure 2:
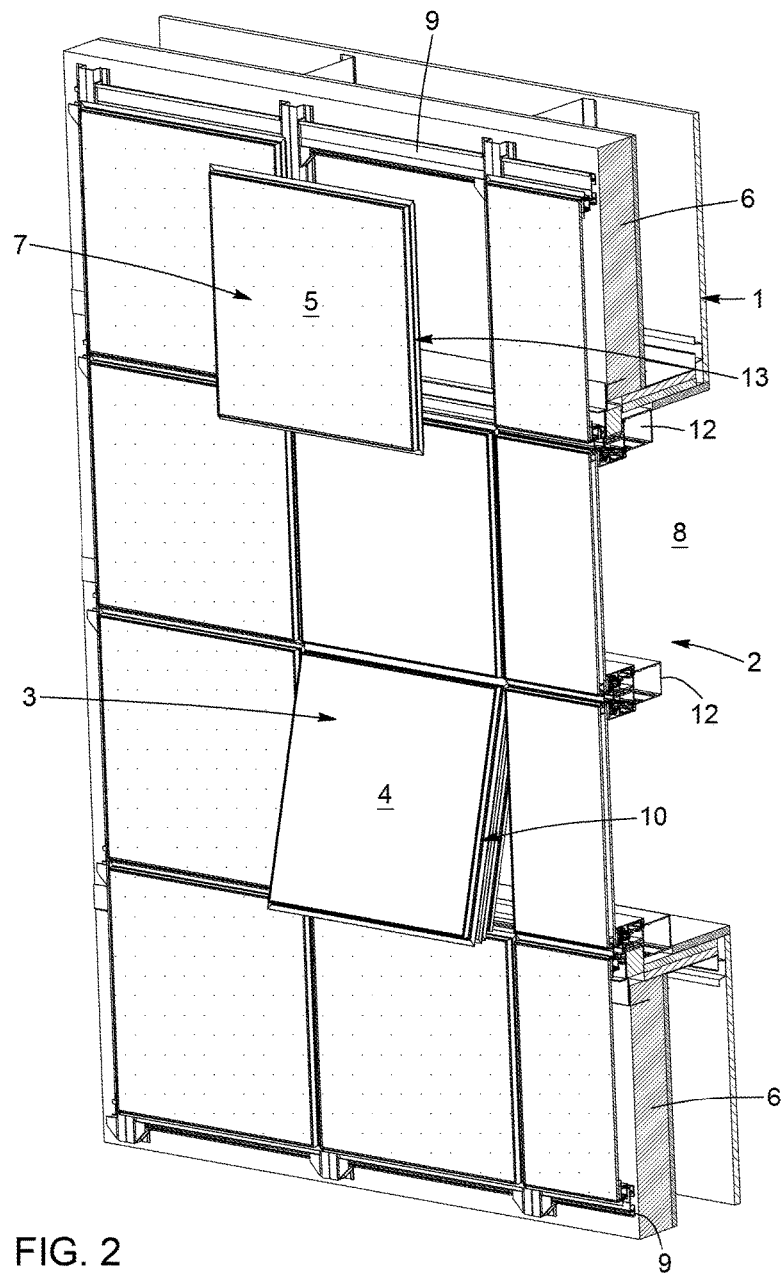
FIG. 2 is a cross-sectional perspective view of the building facade system of FIG. 1 along a third vertical row of panels covering portions of the window opening and building wall.

FIGS. 1 and 2 illustrate an embodiment of the building facade system (2) including four horizontal rows of panels (4, 5) covering the building facade (1). Referring to FIG. 2, central panels covering portions of a window opening (8) of the building facade (1) are referred to as window panels (4). Window panels (4) are mountable onto vertically-extending and horizontally-extending mullions (12) encased within the window opening (8), via a window connecting assembly (10) of a window assembly (3) (which can be referred to as a curtain window wall assembly). Surrounding panels for covering a portion of a building wall (6) are referred to as wall panels (5). Wall panels (5) are mountable onto vertically-extending and horizontally-extending rails (9) which are secured to the building wall (6), via a wall connecting assembly (13) of a wall assembly (7).

The panels (4, 5) can be made of various materials depending of the desired properties and aesthetic to be conferred to the building facade (1). For example, a wall panel (5) can be made of wood, plastic, composite material, ceramic, glass, concrete, fiber-cement, or combination thereof. Optionally, a first series of wall panel (5) may be made of a first material and a second series of wall panels (5) may be made of a second material, the first material differing from the second material in terms of thermal properties, mechanical properties, optical properties, texture, color, or a combination thereof. Additionally, a window panel (4) may be made of any translucent material to let light cross the window panel (4). The window panel (4) may further include an exterior glazing sheet and/or an interior glazing sheet to control the level of light crossing the window panel (4). It should further be noted that each window panel (4) may be constructed as two or more parallel glass panes separated by an air or inert gas gap in-between. Further optionally, wall panels and window panels may be positioned with respect to the building facade so as to define patterns having various aesthetic designs.

Referring to FIG. 2, the building facade system (2) according to the present invention therefore includes a plurality of window assemblies (3) and wall assemblies (7) mountable onto respective mullions (12) and rails (9) of the building facade (1). The window assemblies (3) and wall assemblies (7) are arranged with respect to one another in accordance with the positioning of the window openings (8) in the building facade (1). Each window assembly (3) includes one window panel (4) and one window connecting assembly (10). Each wall assembly (7) includes one wall panel (5) and one wall connecting assembly (13). Adjacent window assemblies (3) mounted onto mullions (12) of the window opening (8) form a curtain window wall. Adjacent wall assemblies (7) mounted onto rails (9) of the building wall (6) from a curtain wall.

Still referring to FIG. 2, each one of the window panels (4) is secured to the mullions (12) by the window connecting assembly (10) and each one of the wall panels (5) is secured to the rails (9) by the wall connecting assembly (13). Two adjacent window connecting assemblies (10) are positioned with respect to one another to ensure that the two window panels (4) are kept in a coplanar relationship with one another. More particularly, the two adjacent window connecting assemblies (10) are aligned with respect to one another. As seen on FIGS. 4 and 5, a window connecting assembly (10) is staggered with respect to an adjacent wall connecting assembly (13) to ensure that the window panel (4) is kept in a coplanar relationship with the adjacent wall panel (5), to make up for the gap between the rail (9) and the mullion (12). Configurations of the window and wall connecting assemblies (10, 13) will be described in greater details further below with reference to the relevant Figures.

In the embodiments shown in the Figures, since each one of window panels (4) and wall panels (5) is square in shape, the interconnected profiles of the respective window connecting assembly (10) and wall connecting assembly (13) are similarly of square shape. One skilled in the art will readily understand the geometry of the panels (4, 5) defines the geometry of the connecting assemblies (10, 13). In an alternative embodiment than the ones shown in the Figures, the building facade system may be configured to enable arrangement of window and wall panels of rectangular shape, triangular shape, hexagonal shape, or the like.

Challenges in conceiving the building facade system (2) include optimization of the thermal efficiency of the system (2) and reduction of the thermal flow between the interior environment (80) and the exterior environment (81) of the building facade (1). Advantageously, the window assembly (3) includes a thermal break assembly providing for an improved thermal gradient profile of the building facade as will be further understood from the comparison of FIG. 8 (PRIOR ART) and FIG. 9.

It should be noted that the thermal flow refers herein to the amount of thermal energy (or heat) transferred by conduction and/or convection from one material or environment to another material or environment. Typically for a building facade, thermal energy may be transferred between the interior environment (e.g. a room) and the exterior environment by conduction via the solid materials of the building facade system and by convection of the heated or cooled fluids (e.g. air). Thermal efficiency refers herein to the ability of the building facade system to reduce or prevent thermal conduction and convection between the interior environment and the exterior environment via solid materials and fluids respectively.

As mentioned-above and referring to FIG. 2, the window assembly (3) includes the window connecting assembly (10) and the window panel (4), the window panel (4) being mounted onto mullions (12) of the building facade (1) via said window connecting assembly (10). The window connecting assembly (10) includes several interconnected frames to ensure proper securing of the window panel (4). It should be noted that a frame may be referred to as a profile or may include interconnected profiles, as readily understood by a person skilled in the art of windows.

Figure 3:
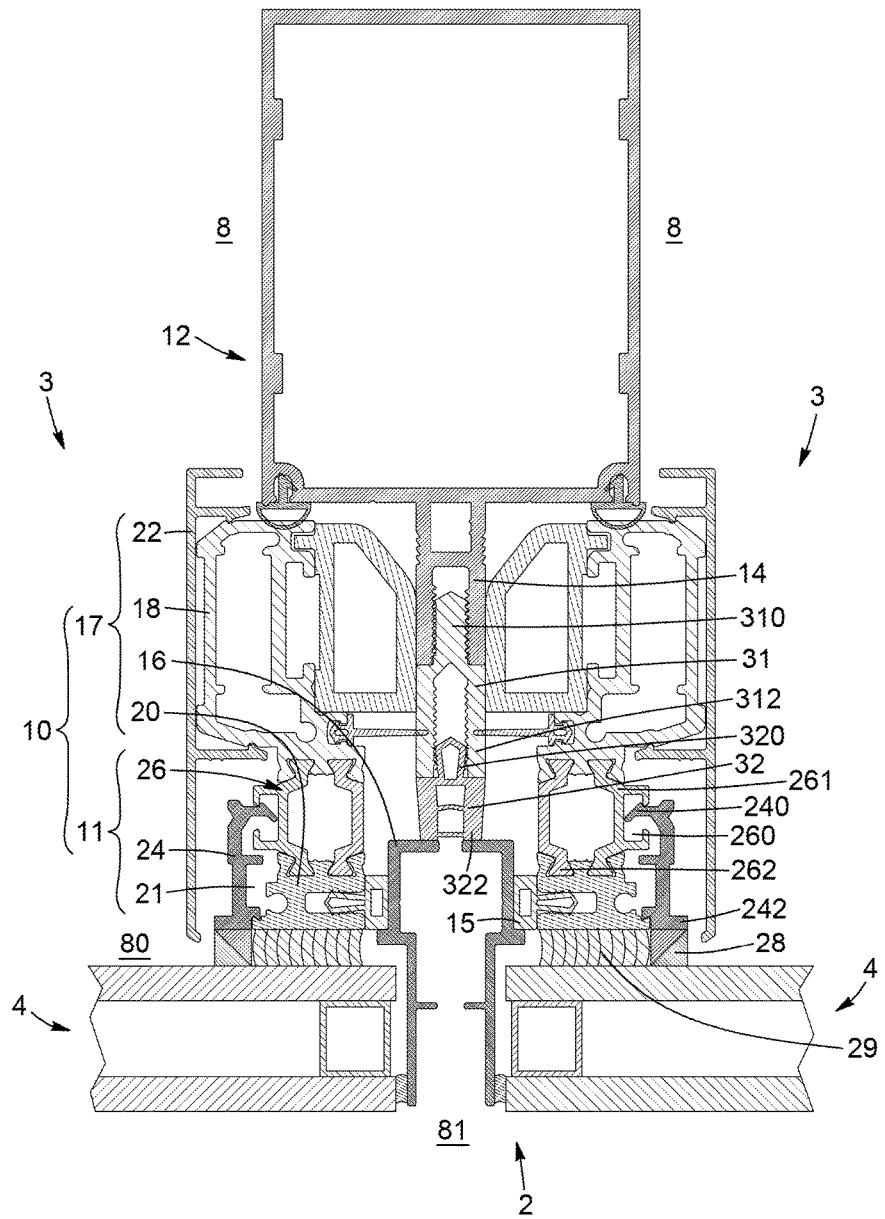
FIG. 3 is a cross-sectional view of the building facade system of FIG. 1 along line III showing a portion of two window assemblies secured to a vertically-extending mullion.

FIG. 3 is a partial cross-sectional view of adjacent sections of two window assemblies (3) in a symmetrical configuration with respect to a vertical mullion (12). Due to this symmetrical configuration, all the following aspects described in relation to one window assembly are applicable to the adjacent and symmetrical window assembly. FIG. 3 shows portions of two window panels (4) mounted to the vertical mullion (12) encased within the window opening (8) via respective window connecting assemblies (10). Each window connecting assembly (10) includes a thermal break assembly (11) and a window profile assembly (17). The window profile assembly (17) is made of a material or a combination of materials which is able to provide strength and lightness to the building facade system (2). The thermal break assembly (11) cooperates with the window profile assembly (17) to ensure reduction and deviation of the thermal flow between the interior environment (80) and the exterior environment (81) via the window profile assembly (17).

Still referring to the embodiment shown in FIG. 3, each window profile assembly (17) is located on a respective side of the mullion (12), outwardly and externally thereof. One window profile assembly (17) includes an interior profile (18) extending outwardly from the mullion (12), and an exterior profile (20) extending internally from an inner surface of the corresponding window panel (4) and towards the interior profile (18). Inwardly refers to an orientation towards an interior of an internal space defined by interconnected mullions while outwardly refers to an orientation towards a center of a respective one of the mullions. The window profile assembly (17) further includes a window panel profile (16) which is sized to receive and support a perimeter of the window panel (4). An external edge portion of the window panel profile (16) is secured to the window panel (4) and an internal edge portion thereof is secured to the exterior profile (20). More particularly, the window panel profile (16) further extends internally over at least a portion of the exterior profile (20) and is secured to the exterior profile (20) via a fastener (15). The panel profile (16) may further extend internally towards the mullion (12) so as to define an L-shape profile. The window profile assembly (17) may further include a finishing cover (22) which extends over the interior profile (18) and the exterior profile (20), inwardly thereof. The finishing cover (22) can be provided to hide portions of the interior and exterior profiles (18, 20) which would be otherwise visible from the interior environment (80) of the building facade (1). Optionally, the finishing cover (22) includes outwardly extending jaws which mechanically engage the interior profile (18).

It should be noted that internally refers to an orientation towards an interior of the building covered with the building facade system while externally refers to an orientation towards an exterior of the building.

In some implementations, as seen in FIG. 3, the mullion (12) may be shaped to define a mullion profile (14) extending outwardly towards a proximal end portion of the L-shape panel profiles (16), until contacting intermediate elements of the two window connecting assemblies (10), which will be defined further below.

It should be further noted that the above window profiles (16, 18, 20 and 22) are made of a material providing both strength and lightness to the building facade system (2), including aluminum, stainless steel, weathering steel, any anti-corrosive metals, any light metals, rigid PVC, or any combinations thereof. In an embodiment, the window profiles (16, 18, 20 and 22) are aluminum extrusions.

Still referring to the embodiment shown in FIG. 3, the window connecting assembly (10) further includes the thermal break assembly (11) to mechanically connect the interior profile (18) to the exterior profile (20) and to simultaneously provide a thermal break therebetween. The thermal break assembly thereby reduces the thermal flow between the interior environment (80) and the exterior environment (81) via the window profile assembly (17). Elements of the thermal break assembly (11) are designed and associated with elements of the window profile assembly (17) for externally deviating a thermal gradient profile along the building facade. More particularly, the thermal break assembly (11) includes a bypass insulating profile (24) and a connection insulating profile (26). The connection insulating profile (26) is designed to provide a thermal break between the interior profile (18) and the exterior profile (20). The bypass insulating profile (24) is designed to provide a thermal break between the interior environment (80) and the exterior profile (20).

As seen in FIGS. 3 to 5 and 9, the connection insulating profile (26) can be composed of two opposed insulating halves (261, 262), spaced away from each other so as to define an air gap therebetween. A proximal end of each of the two halves (261, 262) is engaged within a corresponding recess of the interior profile (18), and a distal end of each of the two halves (261, 262) is engaged within a corresponding recess of the exterior profile (20). The inner surface of the connection insulating profile (26) is thereby in contact with the bypass insulating profile (24). Such design of the connection insulating profile (26) optimizes reduction of the thermal flow between the interior profile (18) and the exterior profile (20) by conduction and/or convection. Reduction of the thermal flow includes reduction of the thermal conduction between the interior profile (18) and the exterior profile (20) by providing the connecting insulating profile (26).

As seen in FIGS. 3 to 5 and 9, the bypass insulating profile (24) of the thermal break assembly (11) is sized and shaped to extend externally and inwardly from the connection insulating profile (26) towards the inner surface of the window panel (4), while bypassing the exterior profile (20). An air chamber (21) is thereby provided between an inward exposed surface of the exterior profile and the bypass insulating profile (24). It should be noted that the inward exposed surface of the exterior profile (20) refers to a portion of the surface of the exterior profile (20) which would be directly exposed to the interior environment (80) in absence of the bypass insulating profile (24). Such design of the bypass insulating profile (24) optimizes reduction of the thermal flow between the exterior profile (20) and the interior environment (80) by conduction and/or convection. Reduction of the thermal flow includes reducing thermal conduction between the interior environment (80) and the exterior profile (20) by providing the bypass insulating profile (24) having a lower thermal conductivity than the exterior profile (20). Reduction of the thermal flow further includes reducing thermal convection between the interior environment (80) and the exterior profile (20) by providing the air chamber (21) therebetween.

Still referring to FIG. 3, the bypass insulating profile (24) has an external end portion (242) located proximal to the inner surface of the window panel (4). Optionally, the external end portion (242) may be engaged within a recess defined in the exterior profile (20), inwardly of the window panel (4), to further enhance mechanical strength of the window assembly (3). The bypass insulating profile (24) also has an internal end portion (240) engaged within a connection recess (260) of the connection insulating profile (26). More particularly, the connection insulating profile (26) has two protrusions extending inwardly to form a jaw with the connection recess (260) defined in-between. The internal end portion (240) of the bypass insulating profile (24) extends outwardly and is inserted into the connection recess (260) of the connection insulating profile (26) to mechanically engage the bypass insulating profile (24) to the connection insulating profile (26). In the embodiment shown in FIG. 3, the jaw of the connection insulating profile (26) is located intermediate between an internal end portion of the first halve (261), engaged with the interior profile (18), and an external end portion of the first halve (261), engaged with the exterior profile (20).

It should be noted that the connexion between the bypass insulating profile (24) and the connection insulating profile (26) may differ from the embodiments shown in FIGS. 3 to 6 and 9.

At least one seal may extend between external end surfaces of the bypass insulating profile and the exterior profile and the inner surface of the window panel. Still in the embodiment shown in FIG. 3, a gasket seal (28) is provided between the external end (242) of the bypass insulating profile (24) and an inner surface of the window panel (4) for mating and sealing therebetween by compression fit. The gasket seal (28) may be made of a foam of polyurethane, or any other suitable foam material. Optionally, the gasket seal (28) may include an adhesive layer on its internal side and external side, such that the gasket seal (28) can stick to the external end of the bypass insulating profile (24) and inner surface of the window panel (4). A hollow channel formed outwardly from the cooperating gasket seal (28), inner surface of the window panel (4), and external end of the exterior profile (20) can be filled with silicon or another analog sealing material (29). The gasket seal (28) may be used to temporarily adhere the window panel (4) to the window connecting assembly (10) when assembling the window assembly (3) while subsequent application of the silicon or another analog sealing material (29) further secures the window panel (4) to the window connecting assembly (10). Indeed, the bypass insulating profile (24) can be designed to support the weight of the window panel (4) via the gasket seal (28), when mechanically engaged to the both the connection insulating profile (26) and the exterior profile (20).

It should be noted that various shapes and design, differing from the illustrated pin-recess interaction, can be used to ensure the connection between the bypass insulating profile (24) and the connection insulating profile (26). Indeed, the size and shape of the bypass insulating profile (24) and the connection insulating profile (26) can differ from the embodiment shown in FIGS. 3 to 5 and 9, as long as they are able to be interconnected, when the interior profile (18) is mounted to one of the mullions and the exterior profile (20) supports directly or indirectly one window panel (4).

Figure 7:
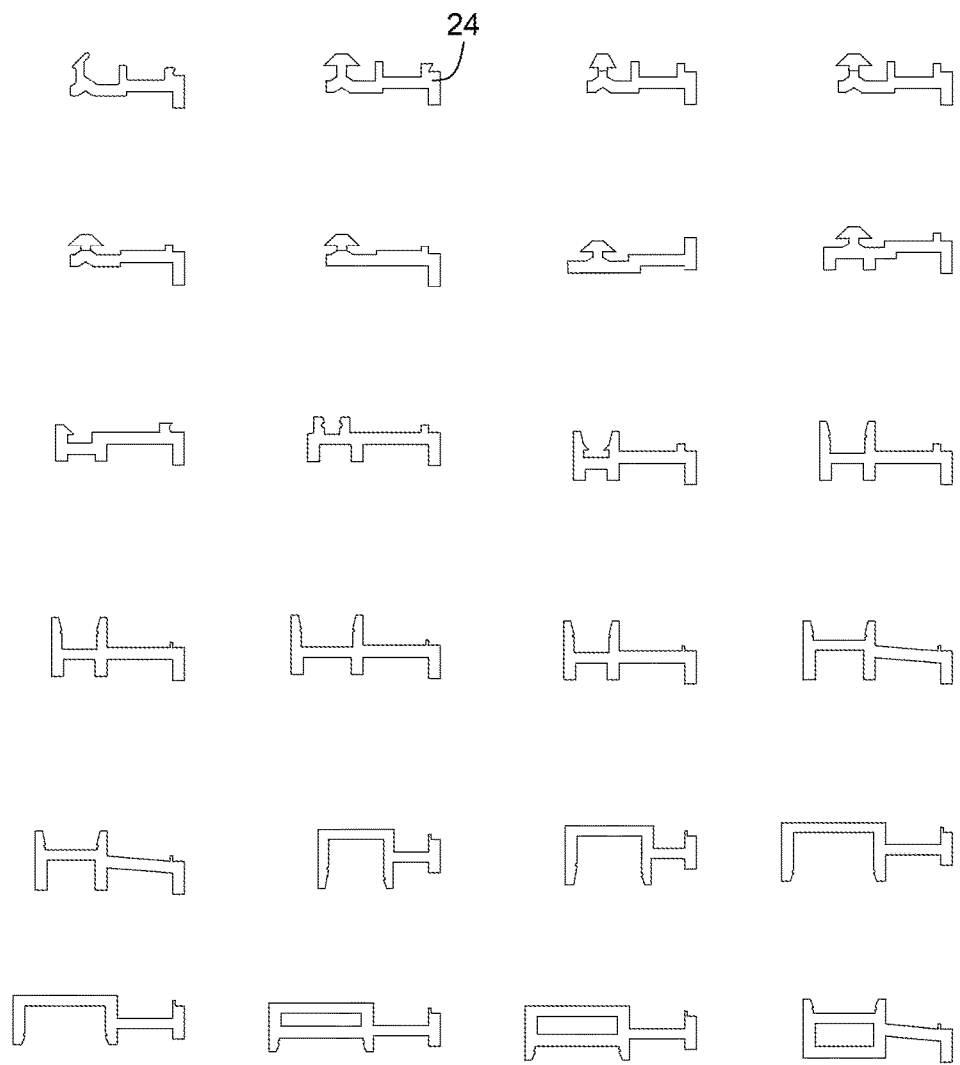
FIG. 7 is a schematic representation of a plurality of bypass insulating profile embodiments.

The thermal conductivity of the bypass insulating profile (24) is selected to reduce the thermal flow from being transferred by conduction from the interior environment (80) to the exterior profile (20). The body of the bypass insulating profile (24) extends at least partially over the exterior profile (20), inwardly thereof, to create the air chamber (21) therebetween and lower the thermal flow being transferred by convection from the interior environment (80) to the exterior profile (20). In some implementations, at least a portion of the body of the bypass insulating profile (24) can be engaged to or contact the exterior window profile (20). In some implementations, the external end portion (242) of the bypass insulating profile (24) may be connected to both the gasket seal (28) of the window panel (4) and the exterior window profile (20). In some implementations, the bypass insulating profile (24) does not extend internally past the connection insulating profile (26). For example, the bypass insulating profile (24) can end with its internal end (240) engaging the connection insulating profile (26). FIG. 7 illustrates for example some of the various available configurations of the bypass insulating profile (24).

It should be noted that the material of the bypass insulating profile (24) and the connection insulating profile (26) can be selected according to a desired thermal gradient to be obtained between the exterior profile (20) and the interior profile (18) of the window assembly (3). For example, materials having a lower thermal conductivity will provide a starker thermal contrast between the exterior profile and the interior profile of the resulting curtain window wall. In some implementations, the bypass insulating profile (24) and the connection insulating profile (26) are made of a material having a lower thermal conductivity than the one of the interior profile (18) and the exterior profile (20) to reduce the flow of thermal energy therebetween. Optionally, the bypass insulating profile (24) may have a lower thermal conductivity than the one of the connection insulating profile (26). The connection insulating profile (26) enables the reduction of the thermal flow from the interior environment (80) via the interior profile (18) that would have been lost through the exterior profile (20). The bypass insulating profile (24) enables the reduction of the thermal flow from the interior environment (80) that would have been lost through the exterior profile (20).

In some implementations, the bypass insulating profile (24) can be made of a rigid polymer including rigid PVC, polyamide or any other suitable rigid insulating material suitable to support a glass layer with good thermal properties and compatible with a sealing material such as the gasket seal (28). The connection insulating profile (26) can be made of polyamide, PVC or any other suitable rigid insulating material.

Referring back to FIG. 3, a thermal break system may be further provided between the panel profile (16) of the window connecting assembly (10) and the mullion profile (14) of the mullion (12) via the combination of a rigid insulating profile (31) and a flexible insulating profile 32. An external end portion (140) of the mullion profile (14) may form jaws defining a recess for mechanically engage an internal rigid end portion (310) of rigid insulating profile (31). Similarly, an external rigid end portion (312) of the rigid insulating profile (31) may form jaws defining another recess for mechanically engage an internal flexible end portion (320) of the flexible insulating profile (32). An external flexible end portion (322) of the flexible insulating profile (32) is designed to contact the internal end of each of the two L-shaped panel profiles from the two connecting assemblies (10) connected to the same mullion (12). In some implementations, the rigid insulating profile (31) may be made of rigid PVC, rigid polyamide or any other suitable rigid insulating material. The flexible insulating profile (32) may be made of flexible PVC or any other suitable flexible insulating material. The interconnected pair of flexible and rigid insulating profile (31, 32) therefore reduces thermal conduction between the L-shaped panel profiles (16) of the two window assemblies (3) and the mullion (12), and lower thermal convection of the air from the external environment into the building facade system (2).

Figure 4:
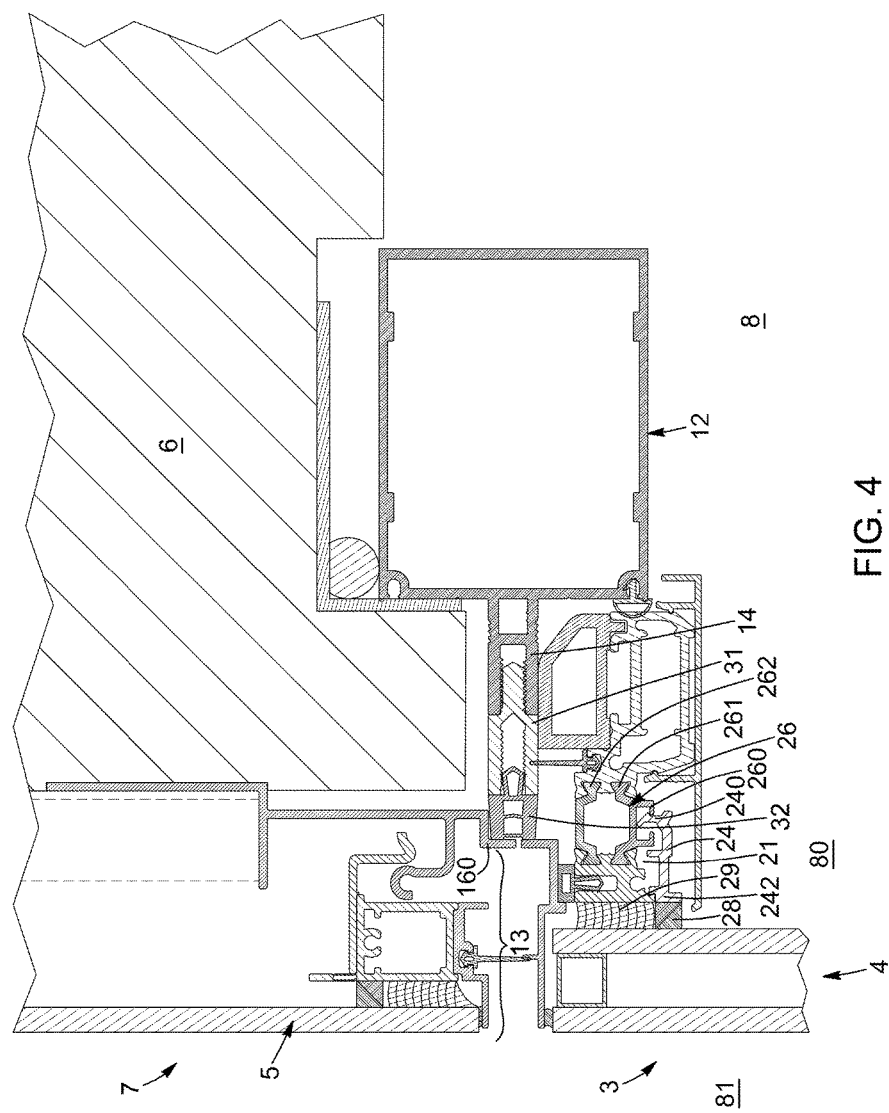
FIG. 4 is a cross-sectional view of the building facade system of FIG. 1 along line IV showing a portion of one window assembly and one wall assembly secured to a horizontally-extending mullion proximate to a top wall portion.
Figure 5:
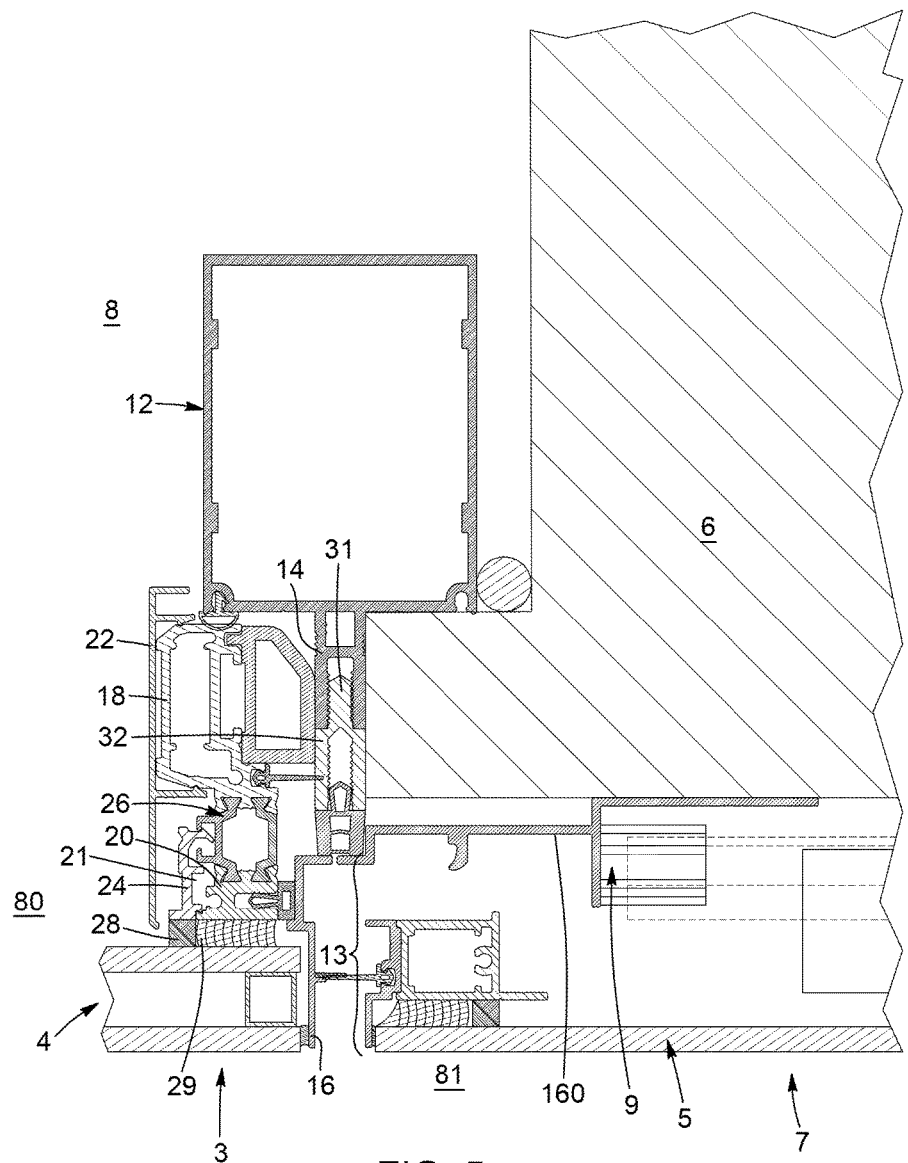
FIG. 5 is a cross-sectional view of the building facade system of FIG. 1 along line V showing a portion of one window assembly and one wall assembly secured to a vertically-extending mullion proximate to a side wall portion.

As shown in FIGS. 4 and 5, it should be noted that the window connecting assembly (10) is configured to cooperate with the wall connecting assembly (13) so as to align window panels (4) covering a window opening (8) to adjacent wall panels (5) covering a building wall (6), even when the mullions (12) of the window opening (8) are not aligned with the rails (9) of the building wall (6) as seen in FIGS. 4 and 5. The interior profile (18) of the window connecting assembly (10) allows the window panel (4) to be staggered with respect to the mullion profile (14) for insertion of the wall portion (6), inwardly of the mullion profile (14). The finishing cover (22) enables to hide said interior profile (18) for esthetic purposes. The insulating profiles (24, 26, 31, 32) ensure that thermal flow is not directly conducted or convected due to such staggering of the window panel (4) with respect to the mullion profile (14). Additionally, the high-performance thermal insulating profile geometry is adapted to avoid heat loss from the interior environment (80) to the exterior profile (20), in any building facade system configurations.

The bypass insulating profile (24) is configured to reduce and deviate the thermal flow between the interior environment (80) and the exterior profile (20), for every position of a window panel (4) with respect to a wall panel (5) or an adjacent window panel (4). FIGS. 4 and 5 provide an illustration of portions of a window assembly (3) encased within a window opening (8) and of an adjacent wall assembly (7) mounted to a rail (9) secured on a top portion and side portion of the building wall (6) respectively. For such a window-to-wall panel connection, it should be noted that one window panel profile (16) and one wall panel profile (160) from the wall connecting assembly (13) are connected to the mullion profile (14) of the mullion (12). As the window panel profile (16), the wall panel profile (160) abuts the flexible insulating profile 32 for ensuring sealing and thermal break between the exterior environment (81) and the mullion profile (14).

Figure 6:
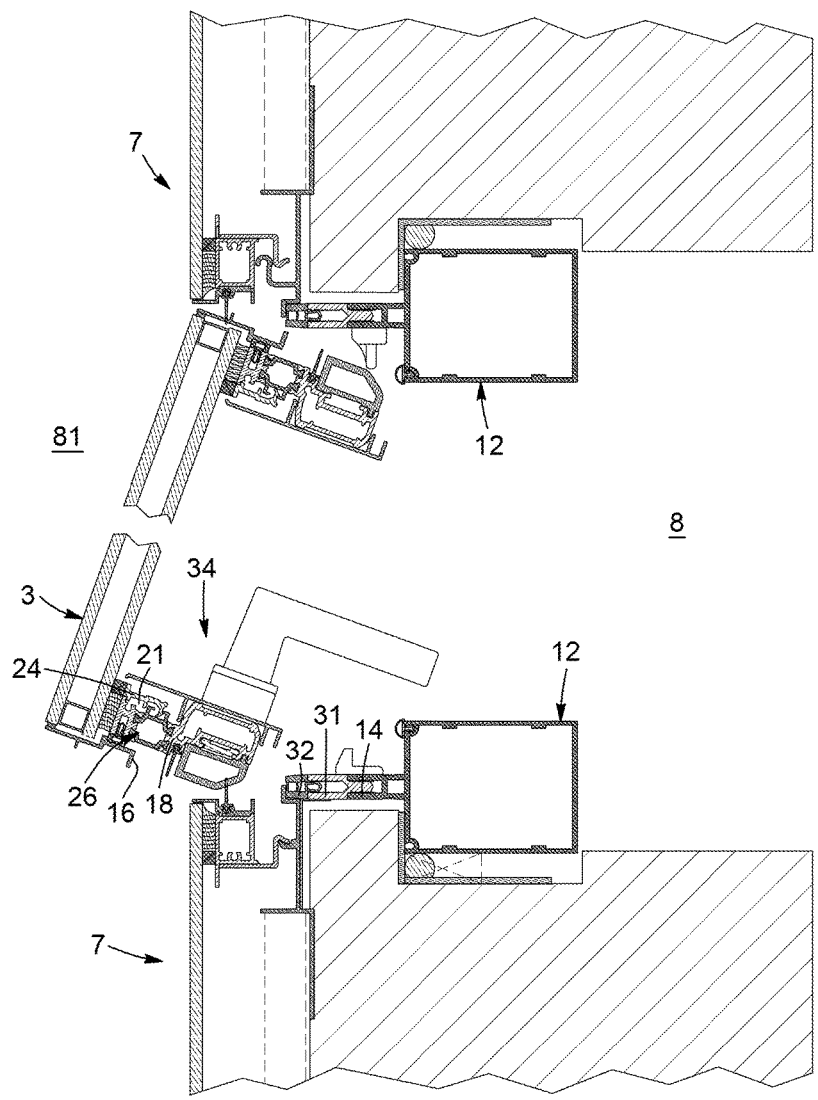
FIG. 6 is a cross sectional view of a portion of a building facade system during opening of a window assembly upon disconnection with respect to a bottom wall portion according to another embodiment.

In the implementations illustrated in FIG. 6, a window assembly (3) may be configured to be opened with respect to the building facade (1) about a horizontally-extending mullion axis. A lower edge of the window assembly (3) can depart externally from the alignment with the adjacent wall assemblies (7) by disconnection of the window panel profile (16) from the horizontally extending mullion (12) encased within a bottom portion of the building wall (6). The interior profile (18) is configured to operatively cooperate with a locking mechanism (34) that is able to reversibly lock the interior profile (18) to the mullion (12). An upper edge of the window assembly (3) is further configured to pivot about a horizontally-extending top mullion (12) along the mullion axis. A window hinge (not illustrated in FIG. 6) can be used to connect and hold the window panel profile (16) to an upper portion of each of the two opposed vertically-extending side mullions (12) during deviation of the window assembly.

Additional seals and/or thermal break elements may be added according to the design and interconnection of the conductive profiles to reduce the thermal flow via such interconnected profiles and without departing from the scope of the present invention.

It should also be understood that any one of the above-mentioned optional aspects of each building facade system, window assembly, window connecting assembly, thermal break assembly and bypass insulating profile may be combined with any other of the aspects thereof, unless two aspects clearly cannot be combined due to their mutually exclusivity. For example, the various structural configurations of the bypass insulating profile illustrated in the appended FIG. 7, may be combined with any of the general description of the thermal break assembly and window connecting assembly appearing herein and/or in accordance with the appended claims.

EXPERIMENTAL RESULTS

Figure 8:
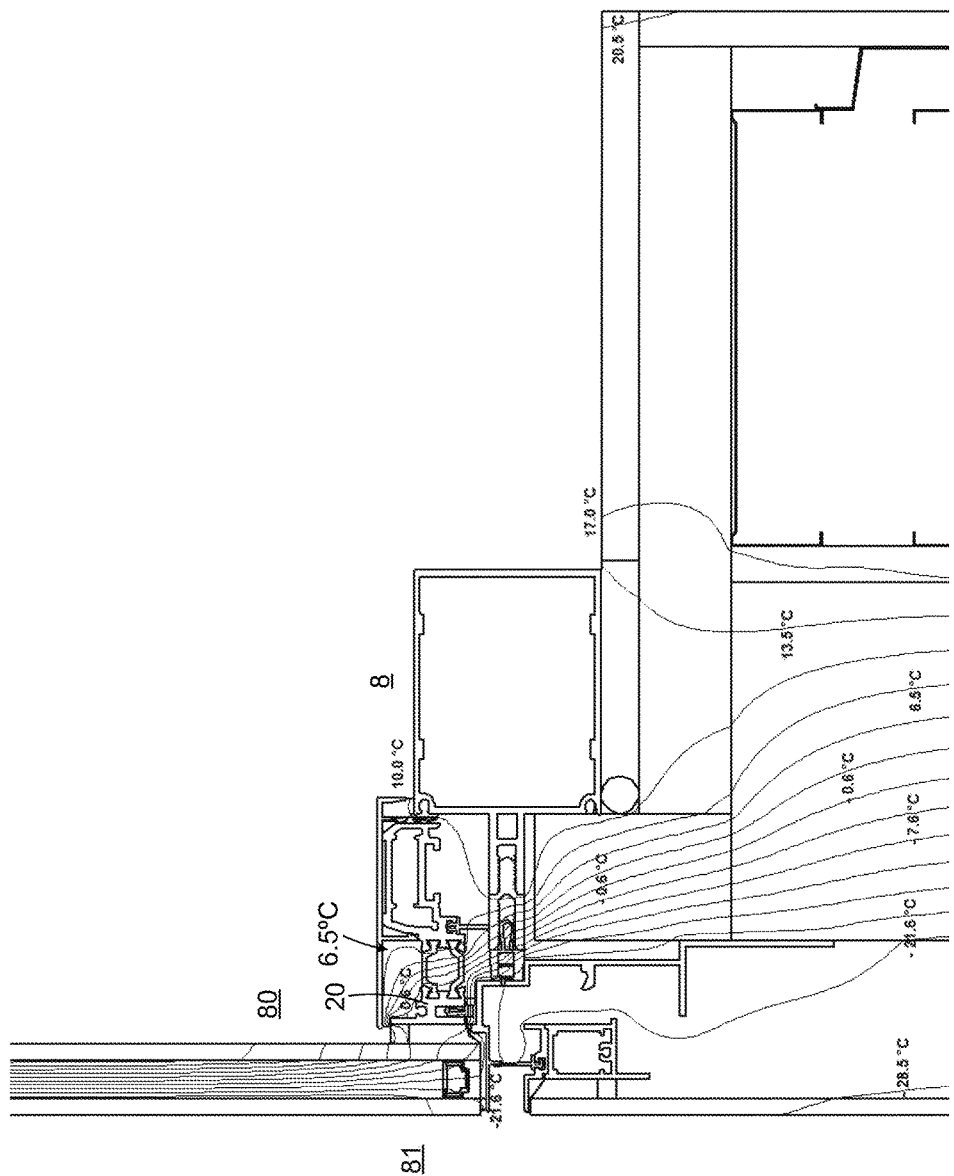
FIG. 8 is a cross-sectional view of a portion of a building facade system including a window assembly covering a window opening and a wall assembly covering a portion of a building wall, showing a thermal gradient profile within this portion of the building facade system (PRIOR ART).
Figure 9:
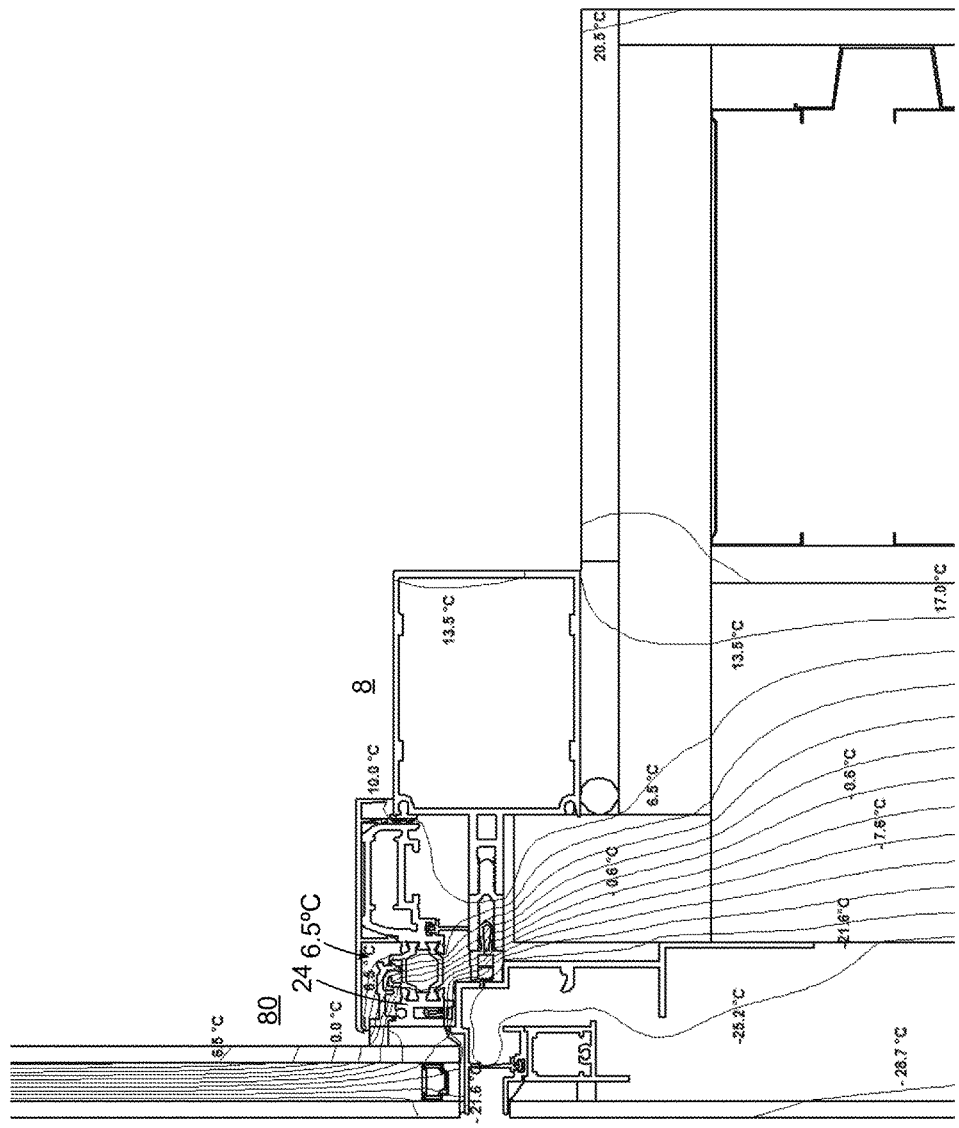
FIG. 9 is cross-sectional view of a portion of the building facade system of FIG. 1 along line IX, showing a thermal gradient profile within this portion of the building facade system including a bypass insulating profile While the invention will be described in conjunction with example embodiments, it will be understood that it is not intended to limit the scope of the building facade system, window assembly and bypass insulating profile to such embodiments. On the contrary, it is intended to cover all alternatives, modifications and equivalents as may be included as defined by the present description and appended claims.

FIGS. 8 and 9 illustrate a thermal gradient profile along the building facade and associated building facade system, in a thermal scenario where the exterior environment (81) is at −30° C. and the interior environment (80) is at 21° C. The thermal simulations were performed using the software THERM 6.3 and Window 6.3. Two glass panes measuring 6 mm sealed together were used to form a 25.4 mm sealed window panel. The wall panel used for the tests consisted of a typical clear glass panel measuring 6 mm. The exterior and interior surface convection coefficients for the simulation were 26 W/m$^2$.K and 3 W/m$^2$.K, respectively.

Referring to FIG. 9, the bypass insulating profile (24) provides an external deviation of the thermal gradient profile to further reduce thermal exchange between the interior environment (80) and the exterior profile (20), leading to undesired thermal losses. Deviation of the thermal gradient profile is taken with respect to a reference gradient profile which is obtained when the bypass insulating profile is removed and as seen in FIG. 8 (Prior Art). Referring to FIG. 8, in absence of the bypass insulating profile, the thermal energy from the interior environment (80) is lost to the thermally conductive exterior profile (20).

One skilled in the art will readily understand from the comparison between the thermal gradient profile of FIG. 9 and the reference thermal gradient profile of FIG. 8, that, for example, the 6.5° C. line is externally deviated from the interior environment (80) towards the bypass insulating profile (24) and window panel (4). A higher temperature is therefore detected proximate to the finishing cover (22) of the interior profile showing reduction of the heat losses into the exterior profile by providing the bypass insulating profile (24).

The invention claimed is:

1. A window assembly mountable to mullions provided across a window opening of a building facade for covering at least partially said window opening, the window assembly comprising:
   a window panel positioned in alignment with the window opening so as to extend between an interior environment and an external environment of the building facade;
   a window profile assembly mechanically connecting the window panel to the mullions of the window opening, the window profile assembly comprising:
      an exterior profile securable to edge portions of the window panel, and
      an interior profile securable to the mullions; and
   a thermal break assembly for reducing a thermal flow between the interior environment and the external environment via the window profile assembly, the thermal break assembly comprising:
      a connection insulating profile mechanically interconnecting the interior profile and the exterior profile, the connecting insulating profile having a lower thermal conductivity than both the exterior profile and the interior profile, to reduce thermal conduction between the interior profile and the exterior profile, and
      a bypass insulating profile extending from the connection insulating profile externally towards the window panel and inwardly over the exterior profile, to define an air chamber between the bypass insulating profile and an inward surface of the exterior profile, thereby reducing thermal convection between the interior environment and the exterior profile.

2. The window assembly of claim 1, wherein the bypass insulating profile has a lower thermal conductivity than the exterior profile, and the bypass insulating profile has a lower thermal conductivity than the connection insulating profile.

3. The window assembly of claim 1, wherein the connection insulating profile comprises two opposed insulating halves, spaced away from each other so as to define an air gap therebetween, each of the two halves has a proximal end engaged within a corresponding recess of the interior profile, and a distal end engaged within another corresponding recess of the exterior profile.

4. The window assembly of claim 1, wherein the connection insulating profile comprises an inner surface and the bypass insulating profile contacts the inner surface of the connection insulating profile.

5. The window assembly of claim 1, wherein the connection insulating profile comprises two protrusions extending inwardly to form a jaw with a connection recess defined in-between, and wherein the bypass insulating profile has an internal end portion engaged within the connection recess of the connection insulating profile.

6. The window assembly of claim 1, wherein the air chamber extends continuously from an internal end of the bypass insulating profile to an external end of the exterior profile.

7. The window assembly of claim 1, wherein an external end portion of the bypass insulating profile mechanically engages with a portion of the inward surface of the exterior profile at an external end thereof.

8. The window assembly of claim 1, wherein the bypass insulating profile and the exterior profile are spaced-apart from an inner surface of the window panel, and the window assembly further comprises at least one seal extending between external end surfaces of the bypass insulating profile and the exterior profile and the inner surface of the window panel.

9. The window assembly of claim 8, comprising a gasket seal provided between the external end surface of the bypass insulating profile and an inner surface of the window panel for mating and sealing therebetween, and a silicon seal filling a hollow channel formed inwardly of the gasket seal, the inner surface of the window panel, and the external end surface of the exterior profile.

10. The window assembly of claim 9, wherein the bypass insulating profile is connected to both the gasket seal and the exterior profile.

11. The window assembly of claim 1, wherein a portion of the interior profile is disconnectable from the mullions so as to enable splaying of the window assembly about a mullion axis, externally thereof.

12. A curtain window wall comprising a plurality of window assemblies as defined in claim 1, each window assembly being independently mountable onto the mullions of the window opening to form the curtain window wall extending across an entire surface of the window opening.

13. The curtain window wall of claim 12, wherein two adjacent window assemblies are in a symmetrical configuration with respect to one mullion.

14. The curtain window wall of claim 12, wherein the window panels are in a coplanar relationship with one another.

15. A building facade system for covering a building facade including a building wall and a window opening defined in said building wall, the building facade system comprising:
   at least one window assembly mountable to mullions provided across the window opening, the window assembly comprising:
      a window panel positioned in alignment with the window opening so as to extend between an interior environment and an external environment of the building facade;
      a window connecting assembly mechanically connecting the window panel to the mullions of the window opening, the window connecting assembly comprising:
         an exterior profile securable to edge portions of the window panel, and
         an interior profile securable to the mullions; and
         a thermal break assembly for reducing a thermal flow between the interior environment and the external environment via the window profile assembly, the thermal break assembly comprising:
            a connection insulating profile mechanically interconnecting the interior profile and the exterior profile, the connecting insulating profile having a lower thermal conductivity than both the exterior profile and the interior profile, to reduce thermal conduction between the interior profile and the exterior profile, and
            a bypass insulating profile extending from the connection insulating profile externally towards the window panel and inwardly over the exterior profile, to define an air chamber between the bypass insulating profile and an inward surface of the exterior profile, thereby reducing thermal convection between the interior environment and the exterior profile; and
   a plurality of wall assemblies surrounding the at least one window assembly, each wall assembly being independently mountable onto rails extending across the building wall and comprising:
      a wall panel for covering a portion of the building wall, the wall panel being spaced-apart from the building wall, and
      a wall connecting assembly comprising at least first and second interconnected profiles, the first profile mechanically engaging a perimeter of the wall panel and the second profile mechanically engaging the rails of the building wall.

16. The building facade system of claim 15, comprising a plurality of window assemblies for covering the window opening, each window assembly being independently mountable onto the mullions of the window opening to form a curtain window wall spreading over an entire surface of the window opening.

17. The building facade system of claim 15, wherein the at least one window assembly and the wall assemblies are arranged with respect to one another in accordance with the positioning of the window opening of the building facade.

18. The building facade system of claim 15, wherein the window panel is in a coplanar relationship with the adjacent wall panels.

19. The building facade system of claim 15, wherein the window connecting assembly is staggered with respect to the adjacent wall connecting assemblies to make up for a gap between the rails and the mullions along the building facade.

20. The building facade system of claim 15, wherein the air chamber extends continuously from an internal end of the bypass insulating profile to an external end of the exterior profile, and wherein the external end of the bypass insulating profile mechanically engages with a portion of the inward surface of the exterior profile at an external end thereof.

* * * * *